Oct. 16, 1962

H. D. HUME 3,058,283

CROP HEADER

Filed Sept. 4, 1959

INVENTOR.
Horace D. Hume
BY
atty

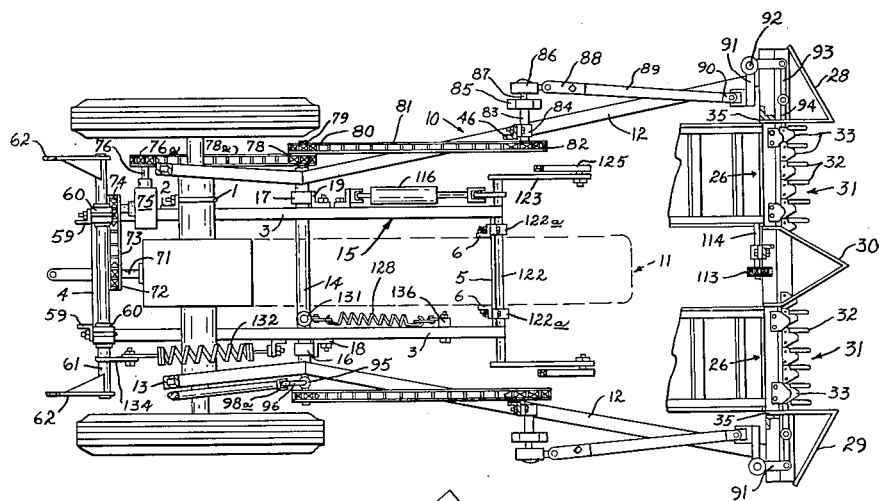
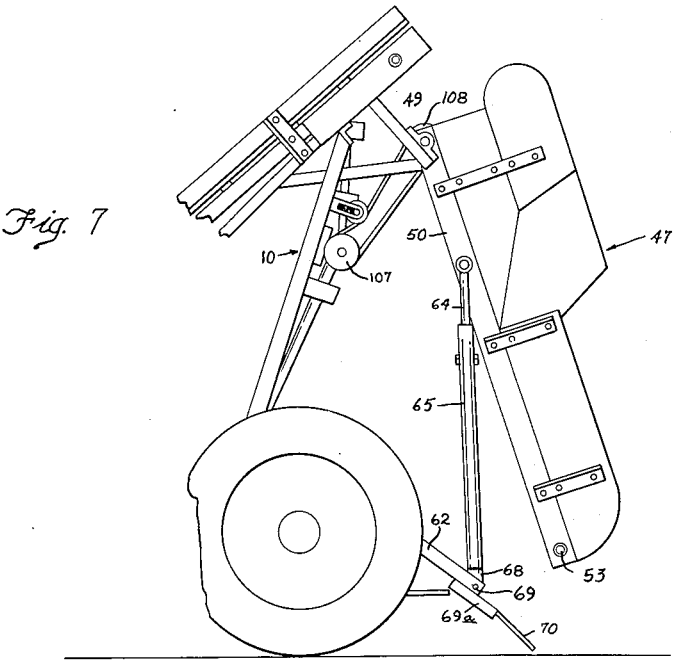

United States Patent Office 3,058,283
Patented Oct. 16, 1962

3,058,283
CROP HEADER
Horace D. Hume, Mendota, Ill.
Filed Sept. 4, 1959, Ser. No. 838,322
4 Claims. (Cl. 56—23)

This invention relates to a novel crop header for use in the harvesting of fragile crops, such as sorghum.

The spread of sorghum raising to the corn belt areas has precipitated a problem in adapting usual sorghum farming methods to these northern areas. Normal combining causes mechanical damage to the soft kernals due to high moisture conditions if the crop is harvested early to avoid frost. Natural field drying runs the risk of frost and is further complicated by the fact that rain or high humidity can cause a quick and substantial rise in the sorghum moisture content.

It is an object of this invention to provide a machine which can "head" and load high moisture content grain without risk of mechanical damage to the seed.

It is a further object to provide such a machine which may be readily mounted upon tractors now in use and which can readily be varied in height for easy adaptability.

It is a further object to provide such a machine which will "head" two rows of the crop simultaneously and will feed the harvested crop into a single conveyor for easy loading. This will enable a single operator to harvest and load a large quantity of the crop each day.

These objects are achieved by the design of an attachment mounted to straddle a tractor and being pivoted upon the a stationary frame attached to the tractor. The height of the cutter blades is controlled by a hydraulic piston. The cutters are fed by a reel and the cut crop is carried upon drapers on either side of the tractor. The two draper loads combine at an elevated position and feed a single loading draper which in turn dumps the crop into a trailer to transport the harvested crop to further processing machines.

These and other objects will present themselves from the following description and drawings which show a preferred embodiment of my invention. It is to be stressed that this embodiment is illustrative only and that this invention is not to be limited except as defined in the claims.

In the drawings:

FIGURE 6 is a sectional view taken along lines 6—6 in FIGURE 1 with the tractor engine shown in broken lines; and FIGURE 7 is a side elevation view of the rear portion of the header showing the loading draper in a transporting position.

Figure 1:
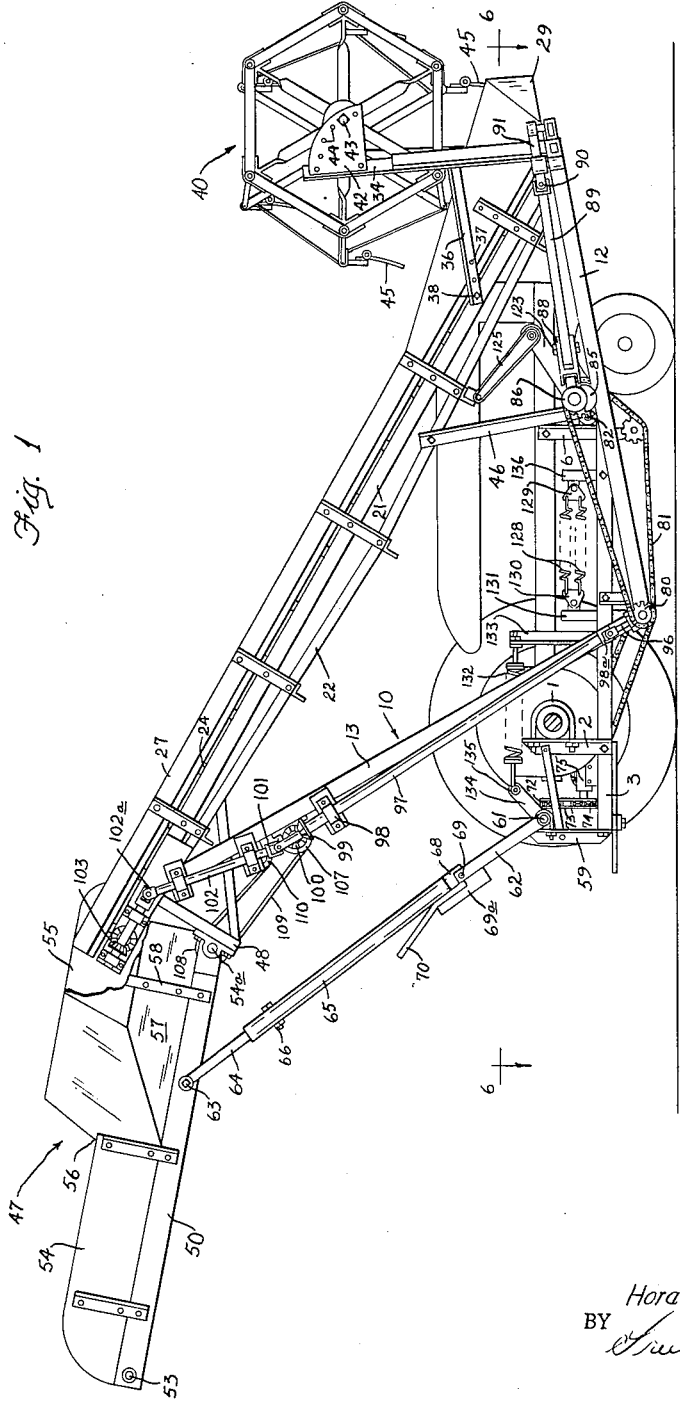
FIGURE 1 is a side elevation of my new crop header mounted upon a conventional farm tractor, with one rear wheel removed for clarity.
Figure 2:
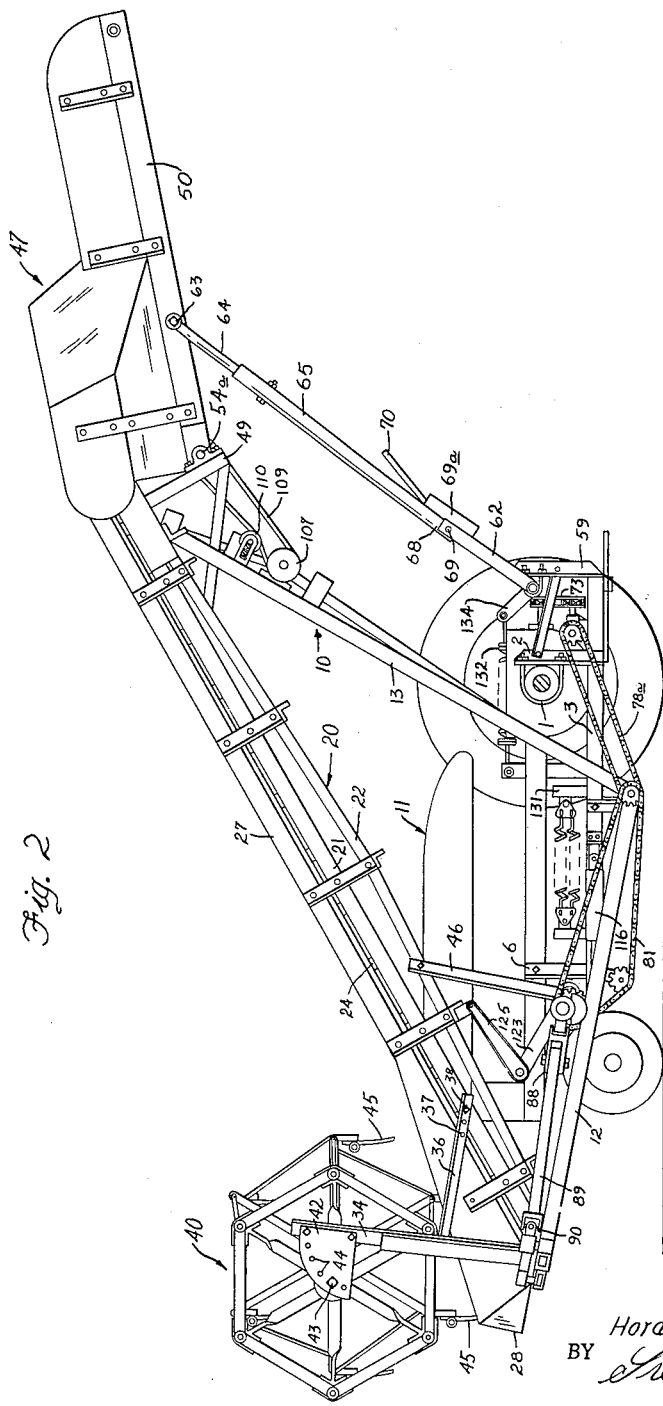
FIGURE 2 is a similar side elevation of my crop header taken of the side opposite to that shown in FIGURE 1.
Figure 3:
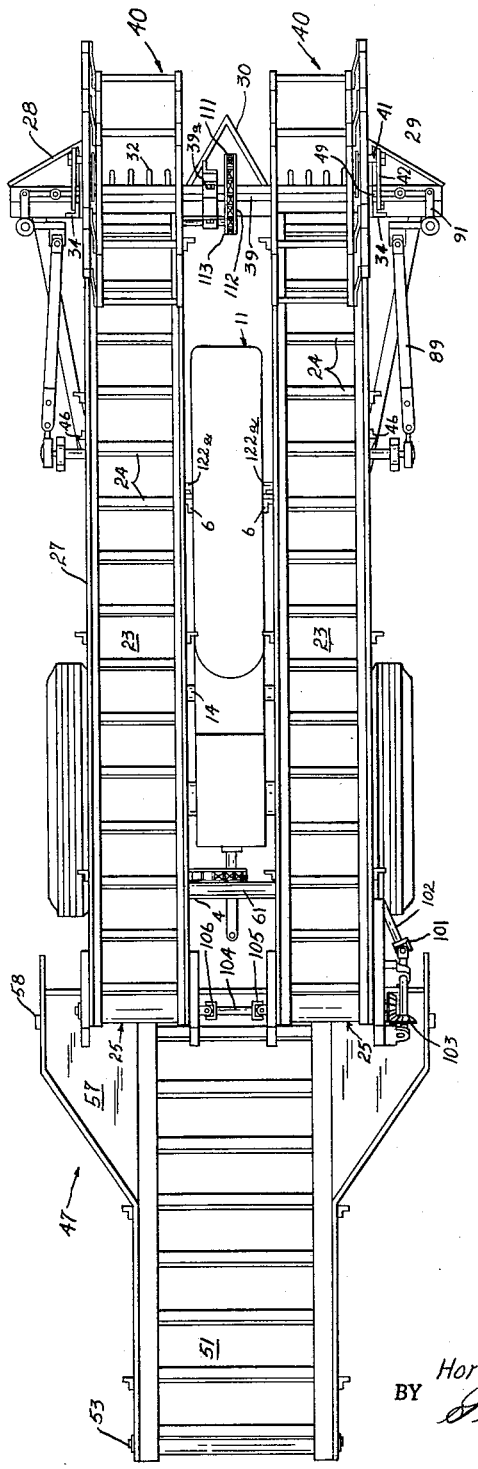
FIGURE 3 is a top plan view of my new crop header.
Figure 4:
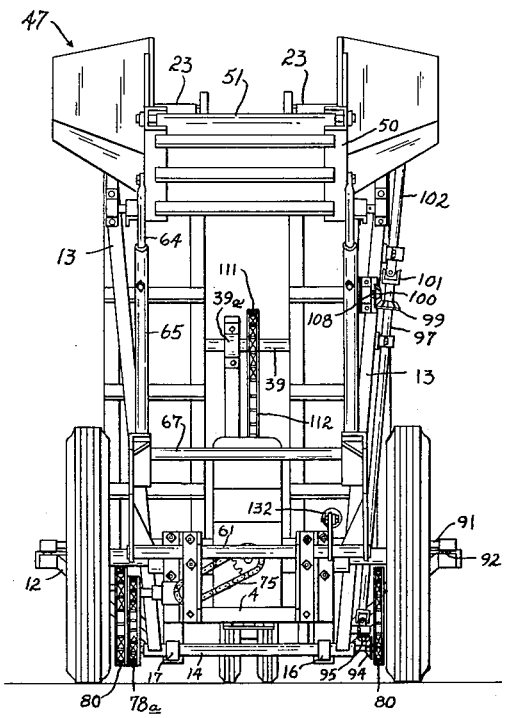
FIGURE 4 is a rear view of my new crop header.

Referring now to the drawings, there is shown an embodiment of my novel crop header. The frame 10 of the header is shown mounted upon a conventional farm tractor 11. Mounted upon tractor 11 is a stationary frame 15. This frame consists of two U-shaped harnesses 1 which wrap around the rear tractor axle and position vertical braces 2. Braces 2 are rigidly connected to longitudinal braces 3 which extend forwardly and are connected at each end by rear cross brace 4 and forward cross brace 5. Forward vertical braces 6 are connected to the tractor 11 and braces 3 to provide a rigid rectangular frame for attachment to an ordinary tractor. The header frame is identical on both sides of the tractor and comprises a lower horizontal bar 12 and an elevating bar 13, both of which are fixed to a hollow cross-shaft 14. The shaft 14 extends beneath stationary frame 15 and is rotatably journaled in two bearings 16, 17 which are positioned on stationary frame 15 by means of angle braces 18, 19. Cross-shaft 14 is the basic pivot for the header frame 10 and insures identical elevation of both sides at all times. The two bars 12 and 13 are joined at their extended ends by a draper suppotring structure 20. This structure 20 comprises a beam having upper arms 21 and lower arms 22. Arms 21 and 22 converge at their ends and are connected to bars 12 and 13. The arms 21, 22 are made of angle stock and have portions facing inwardly to support the edges of draper 23. Draper 23 is of usual construction, having spaced lateral bars 24 and a lower roller 26. Structure 20 also has guard rails 27 mounted at either side of the drapers in vertical planes. These guard rails 27 terminate at their forward ends in three dividers 28, 29, 30. Dividers 28 and 29 are located at the outside edges and turn away any crops not directly before drapers 23. Divider 30 is V-shaped and separates the middle of the crop to feed it to one draper or the other.

Mounted at the forward end of bar 12 directly in front of roller 26 are two cutting bars 31. These bars comprise a stationary series of teeth 32 and a reciprocating series of teeth 33. A more detailed explanation of the cutting bar structure can be found in my prior Patent No. 2,795,922, patented June 18, 1957.

Mounted above the cutting bars are two harvester reels 40 supported by vertical braces 34, which are joined to bars 12 at 35. Horizontal braces 36 connect braces 34 and arms 21 and are provided with a series of holes 37 to receive bolt 38 and permit forward or backward adjustment of reels 40. Reels 40 are fixed to a reel shaft 39, which is journaled in bearing 39a. Plates 42 support outer reel shafts 41 and are fixed to braces 34. Shafts 41 are held by bolts 43 which may be secured at any one of a series of holes 44 located in an arc on plates 42. The specific structure of the harvester reels is fully described in my prior Patent No. 2,644,289 granted July 7, 1953. It is sufficient now to mention only that the reel is constructed so as to always maintain tines 45 in a vertical position to feed the crops to cutter bars 31.

From the foregoing it can be seen that the header frame 10 is generally triangular and extends both rearwardly and forwardly of the main pivot at cross-shaft 14. Braces 46 connect bar 12 and arms 21, 22 for greater rigidity. The two sides which support the drapers 23 are rigidly joined by cross-shaft 14, and the support for cutting bars 31.

A receiving draper carrier 47 is mounted at the upper end of the drapers 23 by means of braces 48, 49 which extend downward from draper supporting structure 20. Carrier 47 comprises a rectangular draper supporting frame 50 which has inwardly facing runners to support the draper edges. Draper 51 is mounted upon front roller 52 and rear roller 53. Frame 50 is joined to the junction of braces 48, 49 by pivot bolts 54a. Frame 50 also supports sides 54 which are wide at the forward end 55 and converge at 56 to a straight line adjacent the side of draper 51. Sides 54 also have a sloping lower portion 57, which are supported by angular braces 58 fixed to frame 50. These sides 54 permit the crops from drapers 23 to converge upon single draper 51 for loading purposes.

Fixed to stationary frame 15 are two uprights 59 which terminate in bearings 60. The bearings 60 support a solid shaft 61 which is inserted within them and extends beyond uprights 59 at either end. Each end of shaft 61 has attached thereto a brace 62. Pivoted to frame 50 by bolts 63 are two downwardly extending tubular members 64. These members 64 telescope within tubular members 65 which are secured by adjustable bolts 66. The lower ends of members 65 are joined by a tubular cross brace 67 and have a short bar 68 welded as an extension. Bars 68 receive bolts 69 which pivot braces 62 and bars 68. Braces 62 have offset extensions 69a which allow the entire structure to pivot beyond dead center for locking. A handle 70 is also provided as an extension of left hand brace 62 to allow manual manipulation of the support braces.

The drive mechanisms will now be described. A power take-off shaft 71 driven by the tractor engine has fixed thereto a chain sprocket 72. Chain 73 is driven by sprocket 72 and drives sprocket 74 on gear box 75. Gear box 75 has an output shaft 76 parallel with cross shaft 14 upon which is mounted a sprocket 76a. Sprocket 76a drives sprocket 78 through chain 78a. Sprocket 78 is mounted near the end of a solid shaft 79 which is journaled in cross-shaft 14 and extends beyond either end of cross-shaft 14. At each end, shaft 79 has fixed upon it sprockets 80, which are driven by the sprocket 78 and shaft 79. These sprockets drive the cutter bar mechanisms by identical structure on either side of frame 10. Taking one side, sprocket 80 drives chain 81 which in turn drives sprocket 82. Sprocket 82 is fixed to the end of a power transfer shaft 83 which is journaled in bearing 84 affixed to braces 46. The shaft 83 has a counterbalance 85 mounted at its other end. Counterbalance 85 pivotally supports journal 86 upon an offset stub shaft 87 mounted in counterbalance 85. Journal 86 has an extension which is pivotally linked with bar 89 by means of a yoke 88. Bar 89 extends forwardly and terminates in a universal joint 90 which links bar 89 and a bell crank member 91. The bell crank member 91 is rotatably secured to pivot about a vertical axis by a stub shaft 92 mounted upon bar 12. The opposite end of bell crank member 91 is pivotally connected to rod 93 which in turn is pivotally connected to an extension 94 of the reciprocating cutter teeth 33. The ecentric rotary motion of shaft 87 is thereby converted to reciprocating straight line motion in teeth 33.

The shaft 79 has fixed to it a bevel gear 94 mounted between pulley 80 and frame 10 at the end opposite to pulley 78. Bevel gear 94 meshes with bevel gear 95 which in turn is fixed to a stub shaft 96. Shaft 96 is connected to extension shaft 97 by universal joint 98a. Shaft 97 extends along bar 13 and is journaled in bearing 98 which is attached to bar 13. Extension shaft 97 carries an attached bevel gear 99 which drives meshing bevel gear 100. Shaft 97 terminates at universal joint 101 connecting it with shaft 102. Shaft 102 drives universal joint 102a and bevel gear 103 connected to the left upper draper roller 25. This roller in turn is connected with right roller 25 by shaft 104 and two universal joints 105, 106. This series of shafts and gears drive drapers 23.

Gear 100 is connected to a V-belt pulley 107 by means of a short shaft 108 rotatably journaled upon bar 13. Pulley 107 drives a similar pulley 108 by means of belt 109 held tight by idler pulley 110. Pulley 108 is fixed to front draper roller 52 of loading draper 51 to drive the draper.

Reels 40 are driven by a sprocket 111 mounted upon central reel shaft 39. Sprocket 111 is driven by chain 112 which is driven by sprocket 113 fixed to an extension 114 of one lower draper roller 26.

Figure 5:
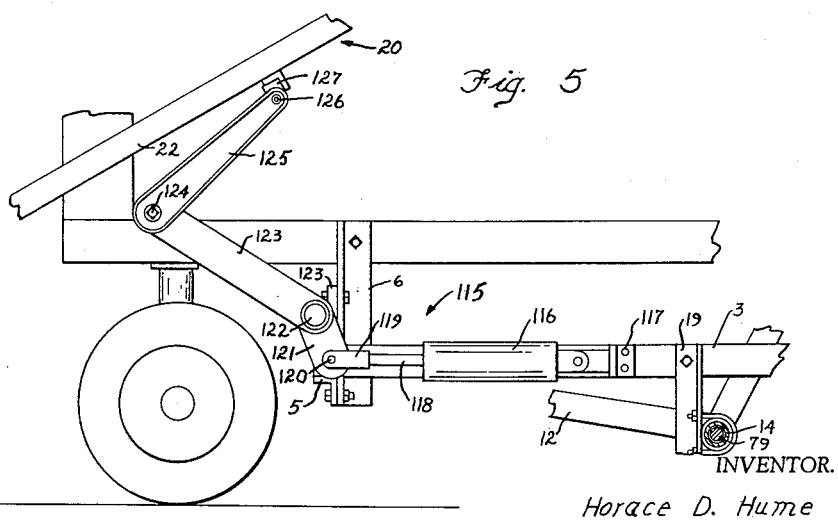
FIGURE 5 is an enlarged view of a portion of my crop header showing the frame lifting linkage.

The means used to lift the forward end of header frame 10 is generally denoted as 115 and is shown in detail in FIGURE 5. The hydraulic piston 116 is mounted beside the right hand brace 3 near its forward end. Piston 116 is pivotally mounted upon brace 3 by means of support bracket 117. The plunger shaft 118 of piston 116 extends forwardly and terminates in yoke 119. This yoke has a pin 120 inserted through it which pivotally connects shaft 118 and crank 121. Crank 121 in turn is connected rigidly with a solid cross-shaft 122 which is journaled in bearings 122a fixed to vertical forward braces 6. Connected to the ends of shaft 122 are two lever arms 123 which in turn are pivoted by pins 124 mounted at the lower end of lever arms 125. The upper ends of levers 125 are connected by pivots 126 to a vertical brace 127 on each side of the draper supporting structure 20. By this mechanism, raising or lowering of both sides of draper support 20 is insured in unison when pressure is applied to piston 116 by conventional control means (not shown).

A bar is provided at the rear of stationary frame 15 which serves as a trailer hitch to pull a receiving trailer below draper carrier 47.

The header frame 10 is well balanced about the pivot cross-shaft 14. In order to prevent this frame from tipping backwards when the load is compacted near the top of drapers 23 or when a sudden upward jolt is transmitted due to uneven footing, counterbalance springs 128 are provided. These springs are located vertically upon a triangular plate 129 pivoted upon right hand vertical brace 136 (FIGURE 1). Springs 128 are mounted upon a similar triangular plate 130 at their other end. Plate 130 is pivotally mounted upon a bar 131 which is fixed to tubular cross-shaft 14. Thus, any upward movement of the forward end of the header frame 10 will result in counterclockwise movement of bar 131 and will be resisted by the loading of springs 128.

Spring loading is also applied to the support for draper carrier 47 as seen in FIGURE 1. A compression spring 132 is mounted upon a vertical angle iron bar 133 rigidly attached to right hand brace 3. This spring 132 is connected between bar 133 and a crank arm 134 by pivot connection 135. Crank arm 134 in turn is welded or otherwise connected to shaft 61. The spring 132 acts through a short lever arm 134 and is not strong enough to throw pivots 69 out of their normal position beyond dead center. Spring 132 acts both as a counterbalance of any extreme forward loading of the header, and as a shock-absorber of sudden jolts received by carrier 47 against the top of the receiving trailer.

The operation of the header seems obvious from the description given. The tractor is moved so as to line up a row of the crop to be harvested before each cutting bar 31. As the tractor is moving, the operator can adjust the height of the cutting bars 31 by use of piston 116. Reels 40 gently draw the top of the crop into the reciprocating cutting teeth 33, which cut the stalks. The cut heads are then carried by drapers 23 to receiving draper 51, which carry them to the trailer. The height of the drapers is fully adjustable to allow use with a trailer of any height. The receiving draper may be manually lifted by handle 70, using the toggle leverage to throw pivot 69 over dead center. By lowering handle 70, this draper may be carried vertically for transporting.

As shown in FIGURE 7, the receiving draper can easily be carried for transporting by lowering handle 70. This will relax spring 132, allowing draper carrier 47 to ride vertically.

It can thus be seen that a header has been shown which is capable of gently cutting and loading fragile crops without damage and which can be readily attached to existing tractors as an attachment. Further modifications may present themselve to those skilled in this art and therefore this invention is not to be limited except as stated in the claims.

Having described my invention, I claim:

1. In a crop header, the combination with a farm tractor of a frame fixed below said tractor, a movable frame pivotally mounted upon said fixed frame having two sides straddling the tractor, each side having mounted thereon a harvesting reel, a cutting bar positioned directly below said harvesting reel, and an elevating draper extending from a position directly behind said cutter bar to an elevated position rearward of said cutter bar, a rearwardly extending draper frame pivoted to the rear end portions of said two sides of the movable frame, support bar means pivoted on the fixed frame rearwardly of the pivot of the movable frame and pivotally connected to the rearwardly extending draper frame at a position spaced rearwardly from the pivot of the said draper frame to said rear end portions, and spring counter-balance means interconnecting the bar means with the first named frame to oppose rearward movement of the support bar means.

2. The invention defined in claim 1 wherein said bar means comprises an upper section and a lower section pivoted to each other, and manually releasable means for securing said sections in alignment, the sections being foldable, one with respect to the other for lowering the rear end of the draper frame.

3. A header for harvesting fragile stalks comprising the combination with a farm tractor, of a first frame fixed to said tractor, a pair of header frames including a common cross shaft, said first frame including bearing supports for said cross shaft adapted to rotatably support said pair of header frames on each side of said tractor and below the main tractor frame, each header from being generally triangular in shape in a vertical direction with the cross shaft being at the apex and including a first side member fixed to and extending forwardly from the cross shaft and a second side member fixed to and extending upwardly and rearwardly from the cross shaft, a conveyor fixed between the outer ends of said first and second side members, cutting means mounted at the forward end of said first side member, adjustable power means mounted on said first frame and operatively connected to each of said header frames adapted to pivot said frame about the axis of said cross shaft, common delivery conveyor means having its forward end pivotally mounted to the two header frames at the rear ends thereof, and longitudinally adjustable support means pivotally connected between said first frame at a location rearward of said cross shaft and said common delivery conveyor means at a location rearward of the pivotal connection of said delivery conveyor means and said header frames.

4. A header for harvesting fragile stalks comprising the combination with a farm tractor of a first frame fixed to said tractor;

a pair of header frames;

said first frame having a depending support at each side thereof for pivotally supporting the header frames on each side of the tractor and below the first frame;

each header frame being generally triangular in shape in a vertical direction with its pivotal connection to the first frame being at the apex and including a first side member extending forwardly from the pivotal connection;

a second side member fixed to and extending upwardly and rearwardly from the pivotal connection and a conveyor fixed between the outer ends of said first and second side members;

cutting means mounted on the forward end of each header frame;

adjustable power means mounted on said first frame and operatively connected to each of said header frames adapted to pivot said frame about its pivotal connection with the depending support;

a common delivery conveyor means having its forward end pivotally mounted to the two header frames at the rear ends thereof;

and longitudinally adjustable support means pivotally connected to said first frame at a distance rearwardly of the depending supports and extending upwardly to said common delivery conveyor means and being pivoted thereto at a location spaced rearward from the pivotal connection of said delivery conveyor means to the header frames.

References Cited in the file of this patent

UNITED STATES PATENTS

| | | |
|---|---|---|
| 1,724,300 | Moncreiffe | Aug. 13, 1929 |
| 2,230,391 | Standlee | Feb. 4, 1941 |
| 2,359,409 | Dray | Oct. 3, 1944 |
| 2,478,072 | Altgelt | Aug. 2, 1949 |
| 2,667,021 | Johnson | Jan. 26, 1954 |